US012012333B1

(12) United States Patent
Leboe et al.

(10) Patent No.: US 12,012,333 B1
(45) Date of Patent: Jun. 18, 2024

(54) METHODS AND SYSTEMS FOR ADJUSTING INPUTS TO A PYROLYSIS REACTOR TO IMPROVE PERFORMANCE

(71) Applicant: EKONA POWER INC., Burnaby (CA)

(72) Inventors: David Aaron Leboe, Vancouver (CA); John Benjamin Hinkey, Jr., Seattle, WA (US); Gary Edward Schubak, Vancouver (CA); Christopher Edwin John Reid, Vancouver (CA); Kenneth William Kratschmar, Vancouver (CA); Michael John Aarnio, Woodway, WA (US)

(73) Assignee: EKONA POWER INC., Burnaby (CA)

( * ) Notice: Subject to any disclaimer, the term of this patent is extended or adjusted under 35 U.S.C. 154(b) by 0 days.

(21) Appl. No.: 18/505,943

(22) Filed: Nov. 9, 2023

Related U.S. Application Data

(60) Provisional application No. 63/433,567, filed on Dec. 19, 2022.

(51) Int. Cl.
*C01B 3/24* (2006.01)
*B01J 6/00* (2006.01)
*C01B 32/05* (2017.01)

(52) U.S. Cl.
CPC .............. *C01B 3/24* (2013.01); *B01J 6/008* (2013.01); *C01B 32/05* (2017.08);
(Continued)

(58) Field of Classification Search
CPC ... C01B 3/24; C01B 32/05; C01B 2203/0266; C01B 2203/0811; C01B 2203/1241; C01B 2203/1685; C01B 2203/1695; B01J 6/008
See application file for complete search history.

(56) References Cited

U.S. PATENT DOCUMENTS

| 4,123,220 A | 10/1978 | Bond et al. |
| 5,190,739 A | 3/1993 | Mackay et al. |

(Continued)

FOREIGN PATENT DOCUMENTS

| CA | 2379892 A1 | 2/2001 |
| CA | 2880075 A1 | 2/2014 |

(Continued)

OTHER PUBLICATIONS

Tsai, et al., Ph.D., Purdue University, Aug. 1975, Surface Reactions Occurring During Pyrolysis of Light Parrafins (Year: 1975).*

(Continued)

*Primary Examiner* — Daniel C. McCracken
(74) *Attorney, Agent, or Firm* — D'Ambrosio & Menon, PLLC; Usha Menon

(57) ABSTRACT

Methods and systems are disclosed that monitor the carbon and hydrogen production of a pyrolysis reactor system and adjust one or more inputs to the reactor system to improve performance when one or both of the monitored carbon and hydrogen production falls outside of a target performance specification. In particular, the ratio of fuel to oxidant ("fuel/oxidant ratio") supplied to a combustion chamber of the reactor system is adjusted to below a fuel/oxidant equivalence ratio range, defined as 0.9-1.1, when both carbon and hydrogen production falls below a target carbon and hydrogen specification, and adjusted above the fuel/oxidant equivalence ratio range when only the carbon production falls below a target carbon specification. The target specification can include a number of parameters including production rate, morphology (of carbon), and operating temperature.

20 Claims, 8 Drawing Sheets

(52) U.S. Cl.
CPC ............. *C01B 2203/0266* (2013.01); *C01B 2203/0811* (2013.01); *C01B 2203/1241* (2013.01); *C01B 2203/1685* (2013.01); *C01B 2203/1695* (2013.01)

(56) References Cited

U.S. PATENT DOCUMENTS

| | | | |
|---|---|---|---|
| 5,300,216 | A | 4/1994 | Hertzberg et al. |
| 5,864,517 | A | 1/1999 | Hinkey et al. |
| 6,986,870 | B1 | 1/2006 | Brandenburg |
| 7,537,623 | B2 | 5/2009 | Etievant et al. |
| 8,721,980 | B2 | 5/2014 | Peters |
| 9,084,978 | B2 | 7/2015 | Peters |
| 9,187,335 | B2 | 11/2015 | Peters |
| 9,359,200 | B2 | 6/2016 | Maass et al. |
| 9,359,218 | B2 | 6/2016 | Peters |
| 9,574,086 | B2 | 2/2017 | Johnson et al. |
| 9,737,865 | B2 | 8/2017 | Peters |
| 9,937,458 | B2 | 4/2018 | Al-Dawood et al. |
| 10,618,026 | B2 | 4/2020 | Taylor et al. |
| 11,020,719 | B2 | 6/2021 | Pannala et al. |
| 11,149,148 | B2 | 10/2021 | Taylor et al. |
| 11,203,692 | B2 | 12/2021 | Hoermann et al. |
| 11,220,428 | B2 | 1/2022 | Kielb |
| 2002/0039548 | A1 | 4/2002 | Matsumura et al. |
| 2004/0166055 | A1 | 8/2004 | Stickney et al. |
| 2005/0072152 | A1 | 4/2005 | Suzuki et al. |
| 2006/0228290 | A1 | 10/2006 | Green |
| 2008/0118413 | A1 | 5/2008 | Lomax et al. |
| 2011/0283705 | A1 | 11/2011 | Oliver |
| 2014/0127121 | A1 | 5/2014 | Maass et al. |
| 2016/0176781 | A1* | 6/2016 | Hershkowitz ........ B01J 19/2415 585/650 |
| 2017/0058128 | A1 | 3/2017 | Johnson et al. |
| 2018/0022925 | A1 | 1/2018 | Hardman et al. |
| 2018/0215615 | A1 | 8/2018 | Kielb |
| 2020/0239696 | A1 | 7/2020 | Johnson et al. |
| 2021/0261417 | A1 | 8/2021 | Cardinal et al. |
| 2022/0315424 | A1 | 10/2022 | Ashton et al. |

FOREIGN PATENT DOCUMENTS

| | | |
|---|---|---|
| CA | 3033943 A1 | 3/2017 |
| CN | 1245480 A | 2/2000 |
| CN | 1339014 A | 3/2002 |
| CN | 102583242 A | 7/2012 |
| CN | 104401942 B | 3/2015 |
| CN | 104540583 A | 4/2015 |
| CN | 106854127 A | 6/2017 |
| EP | 0119158 A1 | 9/1984 |
| EP | 1078020 B1 | 11/2003 |
| GB | 1467123 A | 3/1977 |
| JP | S59-168091 | 9/1984 |
| JP | 2003-027241 A | 1/2003 |
| JP | 2004-002186 A | 1/2004 |
| JP | 3844226 A | 2/2004 |
| JP | 2008531924 A | 8/2008 |
| JP | 2015209344 A | 11/2015 |
| JP | 2017-197399 A | 11/2017 |
| RU | 2195425 | 12/2002 |
| WO | 9911571 | 3/1999 |
| WO | 9958614 A1 | 11/1999 |
| WO | 2002062700 A3 | 8/2002 |
| WO | 2006108124 A2 | 10/2006 |
| WO | 2011022761 A1 | 3/2011 |
| WO | 2020118417 A1 | 6/2020 |

OTHER PUBLICATIONS

Kinetic model of homogeneous thermal decomposition of methane and ethane, Maryam Younessi-Sinaki, Edgar A. Matida, Feridun Hamdullahpur, Carleton University, Department of Mechanical and Aerospace Engineering, 1125 Colonel By Drive, Ottawa, ON K1S 5B6, Canada. 2009.

Wave rotor design method with three steps including experimental validation, Chan Shining et al. Journal of Engineering for Gas Turbines and Power, Dec. 2017.

Zhang, C., Current status of stationary fuel cells for coal power generation, Clean Energy, Jul. 2018, vol. 2, pp. 126-139.

Abbas, HF et al. Hydrogen production by methane decomposition: A review. International Journal of Hydrogen Energy. Nov. 27, 2009, vol. 35, pp. 1160-1190.

Yang, Yichen Cui, and Ningsheng Cai, Research Progress in Hydrogen Production from Natural Gas Cracking, Journal of Solar Energy, vol. 27, No. 10, pp. 697-972; Oct. 1, 2006.

* cited by examiner

METHODS AND SYSTEMS FOR ADJUSTING INPUTS TO A PYROLYSIS REACTOR TO IMPROVE PERFORMANCE

CROSS-REFERENCE TO RELATED APPLICATION

This application claims priority from U.S. Provisional Patent Application Ser. No. 63/433,567 filed on Dec. 19, 2022, the entire disclosures of which are part of the disclosure of the present application and are hereby incorporated by reference in their entireties.

FIELD

The present disclosure relates to pyrolysis and in particular to methods and systems for adjusting inputs to a pyrolysis reactor to improve performance.

BACKGROUND

Thermal pyrolysis is a method by which a feedstock gas, such as a hydrocarbon, is decomposed into its constituent elements (in the case of a hydrocarbon, carbon and hydrogen). The decomposition is triggered by sufficiently raising the temperature of the feedstock gas to a point at which the chemical bonds of the elements of the feedstock gas break down.

Such pyrolysis may be achieved, for example, by bringing the feedstock gas into thermal contact with a hot fluid. For instance, combustion product gases, formed as a result of combusting a combustible fuel with an oxidant, may be mixed with the feedstock gas. At high-enough temperatures, the mixing of the hot fluid with the feedstock gas, and the transfer of thermal energy from the hot fluid to the feedstock gas, is sufficient to cause the feedstock gas to break down and decompose.

A pyrolysis reactor can be provided to produce carbon and hydrogen from a hydrocarbon feedstock. The pyrolysis reactor can use catalysts to increase the rate of carbon formation by reducing the temperature and time to produce carbon. However, the effectiveness of the catalysts tend to be reduced by coke deposits in the pyrolysis reactor. Coke formation is a function of fluid composition, residence time and temperature. Coke is a carbonaceous deposit which can severely impact equipment performance in nearly every industry where hydrocarbons are used or processed. Accumulation of coke, also referred to as "carbon fouling", can lead to operational challenges and onerous and costly maintenance procedures in the pyrolysis reactor.

Known carbon fouling mitigation techniques in other applications include equipment surface coating, coked-catalyst regeneration (removing coke deposits from a catalyst substrate to avoid catalyst deactivation either in-situ or ex-situ), steam-air de-coking, thermal shocking (on-line spalling) and mechanical pigging (mechanical scrubbing/scraping) for example. Each of these techniques are tailored to the specific application or process but are designed to either react the carbon away (ex. oxidation) or clean the deposit by weakening bonds or mechanically dislodging it. Most of these mitigation approaches require the core process to be interrupted and the carbon deposits to be removed through a maintenance procedure, and therefore are not ideal for a pyrolysis operation. Some mitigation approaches can be done without the interruption of the process (such as on-line spalling), but are not as effective at removing all the deposited coke, and thus are also not ideal for a pyrolysis operation.

It is therefore an objective to improve upon one or more prior art pyrolysis operations thereby improving thermal pyrolysis performance.

SUMMARY

According to one aspect of the disclosure, there is provided a method for operating a pyrolysis reactor, comprising: supplying a first amount of fuel and oxidant within a fuel/oxidant equivalence ratio range into a combustion chamber and combusting the first amount of fuel and oxidant to produce a combustion product; supplying a feedstock and the combustion product into a mixing chamber, wherein the combustion product mixes with the feedstock and the feedstock is decomposed into reaction products including hydrogen and carbon in a pyrolysis operation; monitoring production of the carbon and hydrogen during the pyrolysis operation; supplying a second amount of oxidant into the mixing chamber when the monitored carbon and hydrogen production is outside a target carbon and hydrogen specification, and reacting the supplied oxidant with carbon attached to walls of the mixing chamber; and supplying a third amount of fuel and oxidant into the combustion chamber at a rich fuel/oxidant ratio above the fuel/oxidant equivalence ratio range when only the monitored carbon production is outside a target carbon specification and combusting the third amount of fuel and oxidant to produce the combustion product and soot; supplying the feedstock, the combustion product and the soot into the mixing chamber, wherein the combustion product and soot mix with the feedstock, and the feedstock is decomposed into the reaction products in a pyrolysis operation and the soot seeds carbon formation.

The fuel/oxidant equivalence ratio range can be between 0.9 and 1.1. At least one of the fuel and feedstock can be selected from a group consisting of methane, natural gas, hydrogen, ethane, propane, butane and mixtures thereof. Monitoring the production of carbon and hydrogen can comprise monitoring a flow rate of the carbon and hydrogen, such as mass flow rate.

When the monitored carbon and hydrogen production is outside the target carbon and hydrogen specification, the method can further comprise executing a de-fouling operation comprising: halting supplying the fuel into the combustion chamber and halting supplying the feedstock into the mixing chamber; and supplying the second amount of oxidant into the combustion chamber and then to the mixing chamber for reacting with the carbon attached to walls of the mixing chamber. Alternatively, when the monitored carbon and hydrogen production is outside the target carbon and hydrogen specification, the method can further comprise executing a lean burn operation comprising: supplying a fourth amount of fuel and oxidant into the combustion chamber at a lean fuel/oxidant ratio below the fuel/oxidant equivalence ratio range, combusting the fourth amount of fuel and some of the fourth amount of oxidant to produce the combustion product, and supplying non-combusted oxidant into the mixing chamber for reacting with the carbon attached to walls of the mixing chamber.

The pyrolysis reactor can comprise multiple reactors each having a mixing chamber, in which case the method further comprises executing the de-fouling operation in the mixing chamber of one of the reactors while executing the pyrolysis operation in the one or more other reactors. Additionally, the method can comprise halting supplying the fuel and supplying only the second amount of oxidant to each reactor of the multiple reactors in sequence, thereby sequentially executing the de-fouling operation in the mixing chamber of each of the reactors.

According to another aspect of the disclosure, there is provided a pyrolysis system, comprising:
(a) at least one combustion chamber having a fuel inlet, an oxidant inlet, a combustion product outlet, and an exhaust outlet;
(b) at least one mixing chamber having a combustion product inlet communicative with the combustion chamber combustion product outlet, a feedstock inlet, and a reaction product outlet;
(c) hydrogen and carbon sensors in communication with the reaction product outlet;
(d) a controller having a memory encoded thereon with program code executable by the controller to:
control supply of a first amount of fuel and oxidant into the at least one combustion chamber within a fuel/oxidant equivalence ratio range, wherein the first amount of fuel and oxidant combust to produce a combustion product; control supply of a feedstock and the combustion product into the at least one mixing chamber, wherein the combustion product mixes with the feedstock and the feedstock is decomposed into reaction products including hydrogen and carbon in a pyrolysis operation;
monitor the hydrogen and carbon sensors to determine production of the hydrogen and carbon during the pyrolysis operation;
control supply of a second amount of oxidant into the at least one mixing chamber when the monitored carbon and hydrogen production is outside a target carbon and hydrogen specification, wherein the supplied oxidant is reacted with carbon attached to walls of the at least one mixing chamber; and
control supply of a third amount of fuel and oxidant into the at least one combustion chamber at a rich fuel/oxidant ratio that is higher than the fuel/oxidant equivalence ratio range when only the monitored carbon production is outside a target carbon specification, wherein the third amount of fuel and oxidant combust to produce the combustion product and soot; and control supply of the feedstock, the combustion product and the soot into the at least one mixing chamber, wherein the combustion product and soot mix with the feedstock, and the feedstock is decomposed into the reaction products in a pyrolysis operation and the soot seeds carbon formation.

The system can comprise multiple reactors wherein each reactor comprises at least one of the combustion chambers. A common mixing chamber can be provided that is communicative with each combustion chamber of the multiple reactors. Alternatively, each reactor can comprise at least one mixing chamber, and the system can further comprise a common reaction product conduit communicative with each mixing chamber of the multiple reactors, in which case the hydrogen and carbon sensors are located in the common reaction product conduit. Additionally, the system can further comprise a common reaction product conduit communicative with each mixing chamber of the multiple reactors and having a carbon separator and a hydrogen separator, in which case the hydrogen sensor is located downstream of the hydrogen separator and the carbon sensor is located downstream of the carbon separator.

The controller memory can be further encoded with program code executable by the controller to sequentially perform a de-fouling operation for each reactor of the multiple reactors, wherein the de-fouling operation comprises for each reactor in sequence: halting supplying the fuel and feedstock to the combustion chamber and mixing chamber respectively, and supplying only the second amount of oxidant to the combustion chamber and then to the mixing chamber, wherein the supplied oxidant is reacted with the carbon attached to walls of each of the mixing chambers. Additionally, the controller can control the supply of the fuel, oxidant and feedstock to all of the reactors to perform a normal pyrolysis operation, except for the reactor performing a de-fouling operation, such that the system continues to produce carbon and hydrogen while sequentially performing the de-fouling operation in each reactor.

According to another aspect of the disclosure, there is provided a method of operating a pyrolysis reactor, comprising: supplying a first amount of fuel and oxidant within a fuel/oxidant equivalence ratio of 0.9 to 1.1 into a combustion chamber and combusting the first amount of fuel and oxidant to produce a combustion product; supplying a feedstock and the combustion product into a mixing chamber, wherein the feedstock mixes with the combustion product and is decomposed into reaction products including hydrogen and carbon in a pyrolysis operation; monitoring production of the carbon and hydrogen during the pyrolysis operation; and supplying a second amount of oxidant into the mixing chamber when the monitored carbon and hydrogen production is outside a target carbon and hydrogen specification, and reacting the supplied second amount of oxidant with the carbon attached to walls of the mixing chamber.

According to yet another aspect of the disclosure there is provided a method of operating a pyrolysis reactor, comprising: supplying a first amount of fuel and oxidant within a fuel/oxidant equivalence ratio of 0.9 to 1.1 into a combustion chamber and combusting the first amount of fuel and oxidant to produce a combustion product; supplying a feedstock and the combustion product into a mixing chamber, wherein the feedstock mixes with the combustion product and is decomposed into reaction products including hydrogen and carbon in a pyrolysis operation; monitoring production of the carbon and hydrogen during the pyrolysis operation; and supplying a second amount of fuel and oxidant into the combustion chamber at a rich fuel/oxidant ratio having a fuel/oxidant equivalence ratio greater than 1.1 when only the monitored carbon production is outside a target carbon specification and combusting the second amount of fuel and oxidant to produce the combustion product and soot; supplying the feedstock, the combustion product and the soot into the mixing chamber, wherein the combustion product and soot mix with the feedstock and the feedstock is decomposed into the reaction products in a pyrolysis operation and the soot seeds carbon formation.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIGS. 4A and 4B show operations in a multiple reactor pyrolysis system according to another embodiment of the disclosure, wherein FIG. 4A shows a series of pyrolysis reactors all executing a normal pyrolysis operation, and FIG. 4B shows each reactor sequentially executing a de-fouling operation while the other reactors execute a normal pyrolysis operation; and FIGS. 5A and 5B are graphs showing the reaction product output from a six reactor pyrolysis system according to another embodiment of the disclosure, wherein FIG. 5A shows the reaction product output of the pyrolysis system when all reactors execute a normal pyrolysis operation, and FIG. 5B shows the reaction product output of the pyrolysis system when each reactor sequentially executes a de-fouling operation while the other reactors execute a normal pyrolysis operation.

DETAILED DESCRIPTION

Figure 1A:
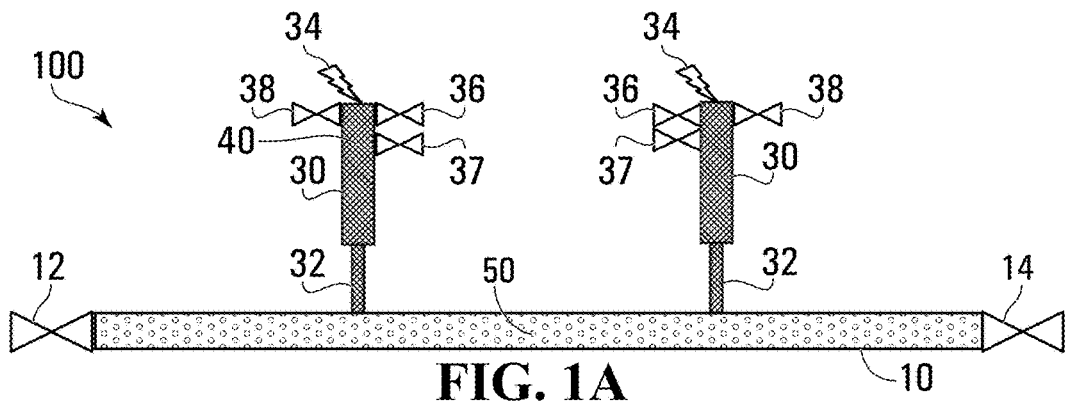
FIG. 1A shows an ignition stage of a pyrolysis cycle in a pyrolysis system, according to an embodiment of the disclosure.

The embodiments described herein relate to methods and systems that monitor the carbon and hydrogen production of a pyrolysis reactor system and adjust one or more inputs to the reactor system to improve performance when one or both of the monitored carbon and hydrogen production falls outside of a target performance specification. In particular, the ratio of fuel to oxidant ("fuel/oxidant ratio") supplied to a combustion chamber of the reactor system is adjusted to below a selected fuel/oxidant equivalence ratio range, when both carbon and hydrogen production falls below a target carbon and hydrogen specification, and adjusted above the fuel/oxidant equivalence ratio range when only the carbon production falls below a target carbon specification. In some embodiments, the selected fuel/oxidant equivalence ratio range is between 0.9-1.1. The target specification can include a number of parameters including production rate, morphology (of carbon), and operating temperature.

Both hydrogen and carbon production performance tends to fall when carbon coats the walls of a mixing chamber of the reactor system. In some embodiments, the fuel/oxidant ratio supplied to the combustion chamber of the reactor system is adjusted to a lean burn condition wherein the fuel/oxidant ratio is below the fuel/oxidant equivalence ratio range, when both monitored hydrogen and carbon production falls outside of a target hydrogen and carbon production specification. In some other embodiments, the fuel supply and a feedstock supply are stopped and only oxidant is supplied to the mixing chamber of the reactor in a de-fouling operation. When operating the reactor system in the lean burn condition or in the de-fouling operation, non-combusted oxidant is supplied to the mixing chamber which reacts with carbon to produce $CO_2$ gas, thereby removing or reducing the amount of carbon coating the mixing chamber walls.

The amount of time required for carbon to form in the mixing chamber during pyrolysis is known as residence time and depends on the amount and morphology of carbon production desired. Ideally, the loading and unloading valve timing and ignition timing of the reactor system are set so that the time from mixing the combustion gases with the feedstock gases to the time the reactor outlet valve is opened to discharge reaction products is equal to the residence time, which should be as short as possible to maximize hydrogen and carbon production for a given reactor size. When only the carbon production performance falls, it is theorized that there is insufficient time to complete the formation of carbon due to an increase in the carbon residence time. In some embodiments, the fuel/oxidant ratio is adjusted to a rich burn condition wherein the fuel/oxidant ratio is above the fuel/oxidant equivalence ratio range, when only the monitored carbon production falls outside a target carbon production specification. When operating the reactor system in the rich burn condition, soot is formed in the combustion chamber, which is supplied to the mixing chamber to reduce the carbon residence time by seeding carbon formation of the feedstock decomposition during thermal pyrolysis.

According to one embodiment and referring to FIGS. 1A-1F, there is shown in detail a sequence of steps that occur during a pyrolysis cycle in a pyrolysis system 100 for decomposing a hydrocarbon feedstock gas into reaction products including hydrogen and carbon.

Referring to FIG. 1A, the pyrolysis system 100 comprises a pair of combustion chambers 30 connected to a mixing chamber 10 via respective fluid pathways 32. Fluid pathways 32 selectively allow the flow of fluids from combustion chambers 30 to mixing chamber 10. According to some embodiments, combustion chambers 30 may connect directly to mixing chamber 10 without the need for intermediary fluid pathways 32. According to still further embodiments, combustion chambers 30 may be provided within mixing chamber 10 such that fluid may flow out of combustion chambers 30 and directly into the interior of mixing chamber 10. While FIG. 1A shows two combustion chambers 30, it shall be understood that the present disclosure extends to any number of combustion chambers (such as a single or multiple combustion chambers) connected to a mixing chamber (or even multiple mixing chambers).

At a first end of mixing chamber 10 is provided an inlet valve 12 for selectively allowing the inflow of a feedstock gas into mixing chamber 10. At an opposite, second end of mixing chamber 10 is provided an outlet controlled by valve 14 for selectively allowing the outflow of gases within mixing chamber 10 to the exterior of mixing chamber 10.

Each combustion chamber 30 comprises inlet valves 36, 37 for selectively allowing the inflow of fuel and oxidant combustion gases into combustion chamber 30, and an outlet controlled by valve 38 for selectively allowing the outflow of combustion product gases within combustion chamber 30 to the exterior of combustion chamber 30. Each combustion chamber 30 further comprises one or more igniters 34 for providing ignition energy sufficient to drive combustion of the combustion gases that has been fed into combustion chamber 30.

The general structure of pyrolysis system 100 remains unchanged during its operation, and therefore with reference to FIGS. 1A-1F the structure of pyrolysis system 100 is not described in further detail.

Beginning at FIG. 1A, there is shown an ignition stage of the pyrolysis cycle. Prior to this stage, a combustion fuel and an oxidant is provided to each combustion chamber 30 via respective fuel and oxidant inlets controlled by valves 36, 37 ("fuel and oxidant valves"). Alternatively (not shown), a fuel and oxidant mixture is provided through a single valve into each combustion chamber 30.

At the same time, a hydrocarbon feedstock gas 50 such as methane is provided to mixing chamber 10 via an inlet controlled by valve 12. In the event that fluid pathways 32 are permanently open, combustion chambers 30 and mixing chamber 10 are filled with their respective gases such that the pressures within each chamber are roughly equal so that little to no mixing of the combustion gas and feedstock gas 50 occurs. Once filling of combustion chambers 30 and mixing chamber 10 is complete, feedstock, fuel, and oxidant valves 12, 36, 37 are closed and pyrolysis system 100 is therefore considered a constant volume system.

During the ignition stage, igniters 34 are activated by a suitable controller 60 (sec FIG. 2), such as a microprocessor or circuitry operatively connected to igniters 34, so as to trigger combustion of the combustion gas within combustion chambers 30. The combustion of the combustion gas produces one or more hot combustion product gases (combustion products 40) within combustion chambers 30 and significantly increases the pressure and temperature within combustion chambers 30 relative to the pressure within mixing chamber 10.

Figure 1B:
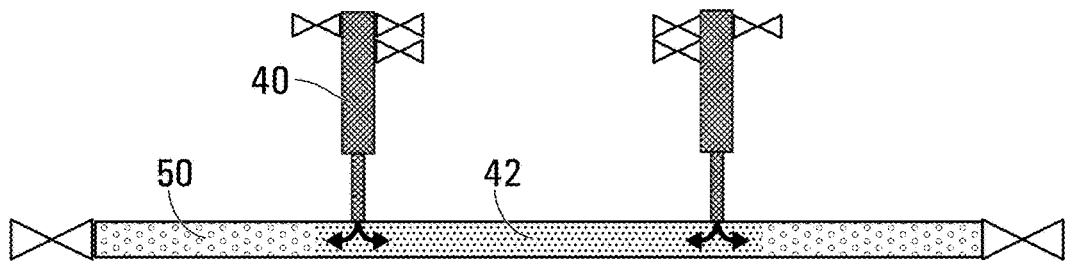
FIG. 1B shows a mixing stage of the pyrolysis cycle.

Turning to FIG. 1B, there is shown a mixing stage of the pyrolysis cycle. During the mixing stage, combustion products 40 flow into mixing chamber 10 via fluid pathways 32, and begin to mix with feedstock gas 50, forming a mixture 42 of pre-reaction combustion products gases and feedstock gas. As this occurs, the pressure within combustion chambers 30 begins to drop.

Figure 1C:
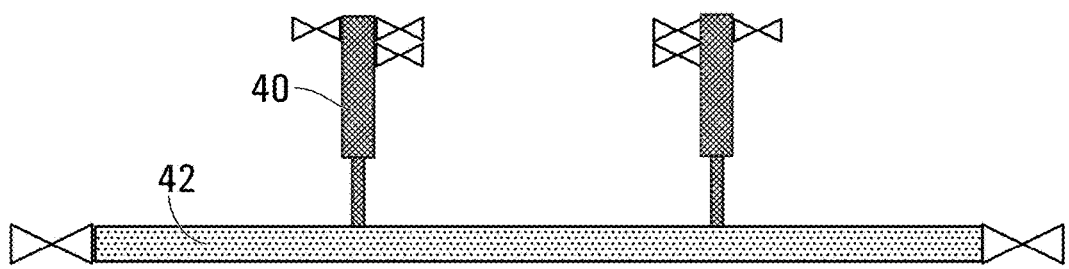
FIG. 1C shows a pre-reaction stage of the pyrolysis cycle.

Turning to FIG. 1C, there is shown a pre-reaction stage of the pyrolysis cycle. During the pre-reaction stage, a significant proportion of combustion products 40 have flowed into mixing chamber 10 and mixed with feedstock gas 50, filling mixing chamber 10 with mixture 42 of pre-reaction combustion products gases and feedstock gas. However, in response to the pressure within combustion chambers 30 dropping to roughly the same pressure within mixing chamber 10, a portion of combustion products 40 have remained within combustion chambers 30. By the end of this stage, the pressures in combustion chambers 30 and mixing chamber 10 have returned to roughly equal levels while still being greater than pre-ignition levels.

As a result of the flow of combustion products 40 into mixing chamber 10, and in particular, as a result of the mixing of combustion products 40 with feedstock gas 50 to form mixture 42, thermal energy is transferred from combustion products 40 to feedstock gas 50. Energy is also transferred from combustion products 40 to feedstock gas 50 via dynamic compression of feedstock gas 50 as a result of the pressure increasing within mixing chamber 10 in response to the flow of hot, pressurized combustion products 40 into mixing chamber 10. Past a certain point, the increase in the temperature of feedstock gas 50 is sufficient to drive decomposition or pyrolysis of feedstock gas 50. In the case of methane, the decomposition takes the following form:

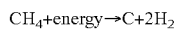

Figure 1D:
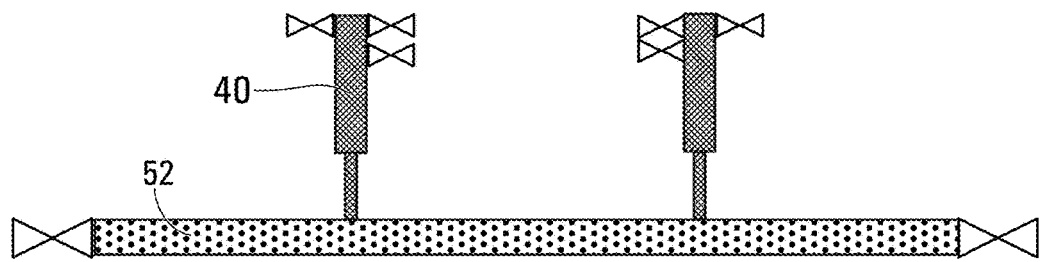
FIG. 1D shows a post-reaction stage of the pyrolysis cycle.

Turning to FIG. 1D, there is shown a post-reaction stage of the pyrolysis cycle. During the post-reaction stage, the pressures within combustion chambers 30 and mixing chamber 10 have equalized. The combustion chambers 30 remain filled with combustion products 40. Mixing chamber 10 generally comprises reaction products 52 formed from the decomposition of feedstock gas 50. For example, in the case of a hydrocarbon feedstock, mixing chamber 10 generally contains carbon and hydrogen as reaction products 52.

Figure 1E:
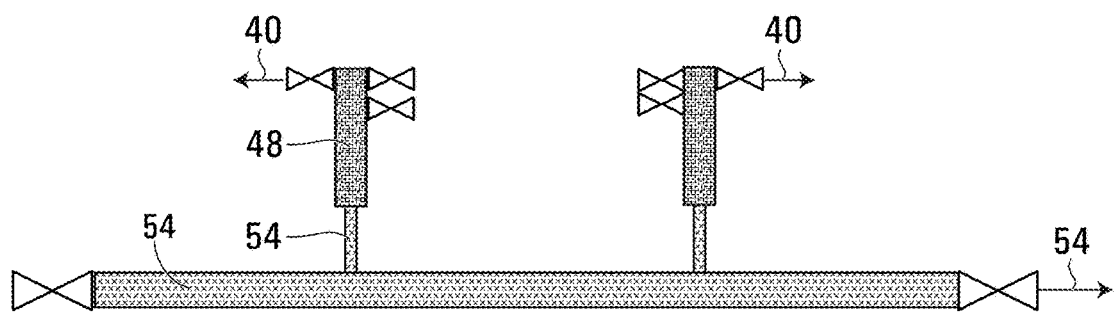
FIG. 1E shows a quenching stage of the pyrolysis cycle.

Turning to FIG. 1E, there is shown a quenching stage of the pyrolysis cycle. During the quenching stage, outlet valve 14 is opened to rapidly decrease the pressure and temperature of reaction products 52 in mixing chamber 10 and quench the pyrolysis reaction, resulting in quenched reaction products 54 within mixing chamber 10 being extracted from mixing chamber 10 via outlet valve 14. In addition, combustion products 40 remaining within combustion chambers 30 and fluid pathways 32 are vented by opening outlet valves 38.

Figure 1F:
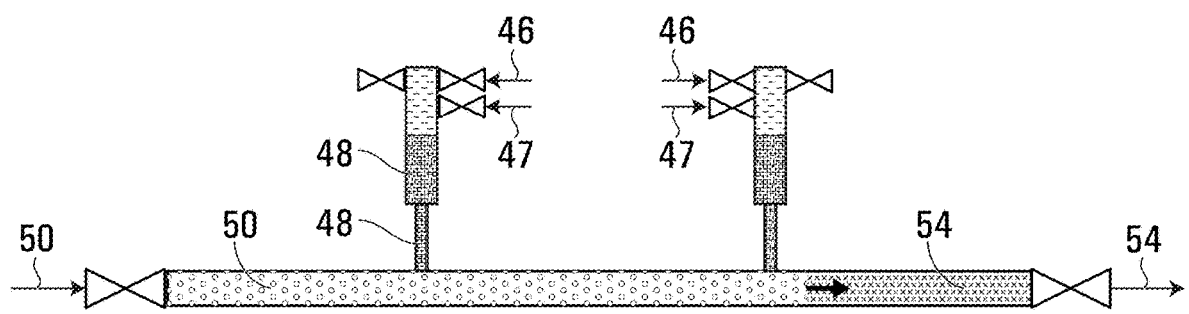
FIG. 1F shows a filling stage of the pyrolysis cycle.

Turning to FIG. 1F, there is shown a filling stage of the pyrolysis cycle. During the filling stage, fresh fuel 46 and oxidant 47 are fed into combustion chambers 30 via fuel and oxidant valves 36, 37. This increases the pressure within combustion chambers 30 and drives quenched combustion product gases 48 and quenched reaction products 54 out of combustion chambers 30 and fluid pathways 32, and into mixing chamber 10. At the same time, fresh feedstock gas 50 is fed into mixing chamber 10 via inlet valve 12 and pushes quenched combustion product gases 48 and quenched reaction products 54 within mixing chamber 10 out of mixing chamber 10 via outlet valve 14. At the end of the filling stage, combustion chambers 30 and fluid pathways 32 generally contain pressurized combustion gas (and any remaining unreacted feedstock gas 44) while mixing chamber 10 generally contains pressurized feedstock gas 50 (and any reaction products or combustion products that may not have been evacuated from mixing chamber 10) ready for decomposition in the next reaction cycle.

Figure 2:
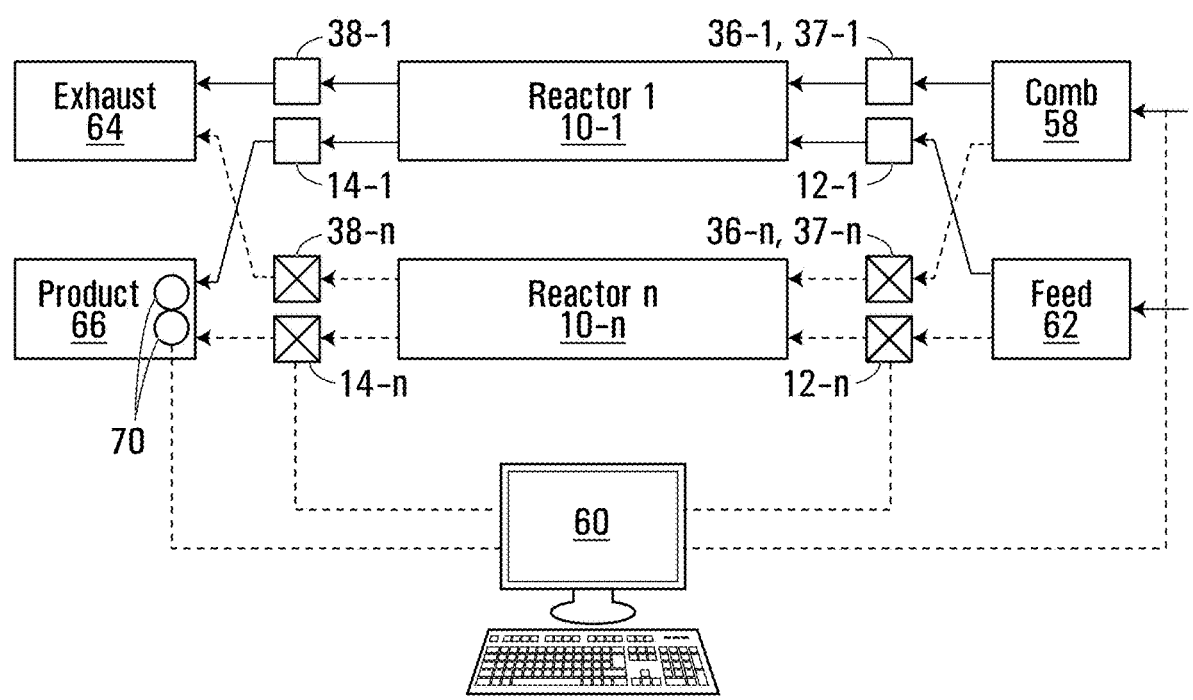
FIG. 2 is a schematic showing an embodiment of a pyrolysis system comprising multiple reactors and a controller programmed to control operation of the pyrolysis cycle in each of the reactors, including controlling feedstock, hydrogen and oxidant inputs to the reactors.

Referring now to FIG. 2 and in some embodiments, the pyrolysis system 100 comprises multiple reactors. In the embodiment shown in FIG. 2, multiple reactors are shown schematically as reactors 1 . . . n, with each comprising a mixing chamber fluidly coupled to a combustion chamber in the manner shown in FIG. 1A-1F. Each combustion chamber has fuel and oxidant valves 36-1 . . . n, 37-1 . . . n for receiving fuel and oxidant from a common combustion header 58, and a combustion product valve 38-1 . . . n for exhausting combustion products to a common exhaust header 64. Each mixing chamber has an inlet valve 12-1 . . . n for receiving feedstock from a common feedstock supply header 62, and outlet valves 14-1 . . . n for discharging reaction products to a common reaction product header 66.

Figure 5A:
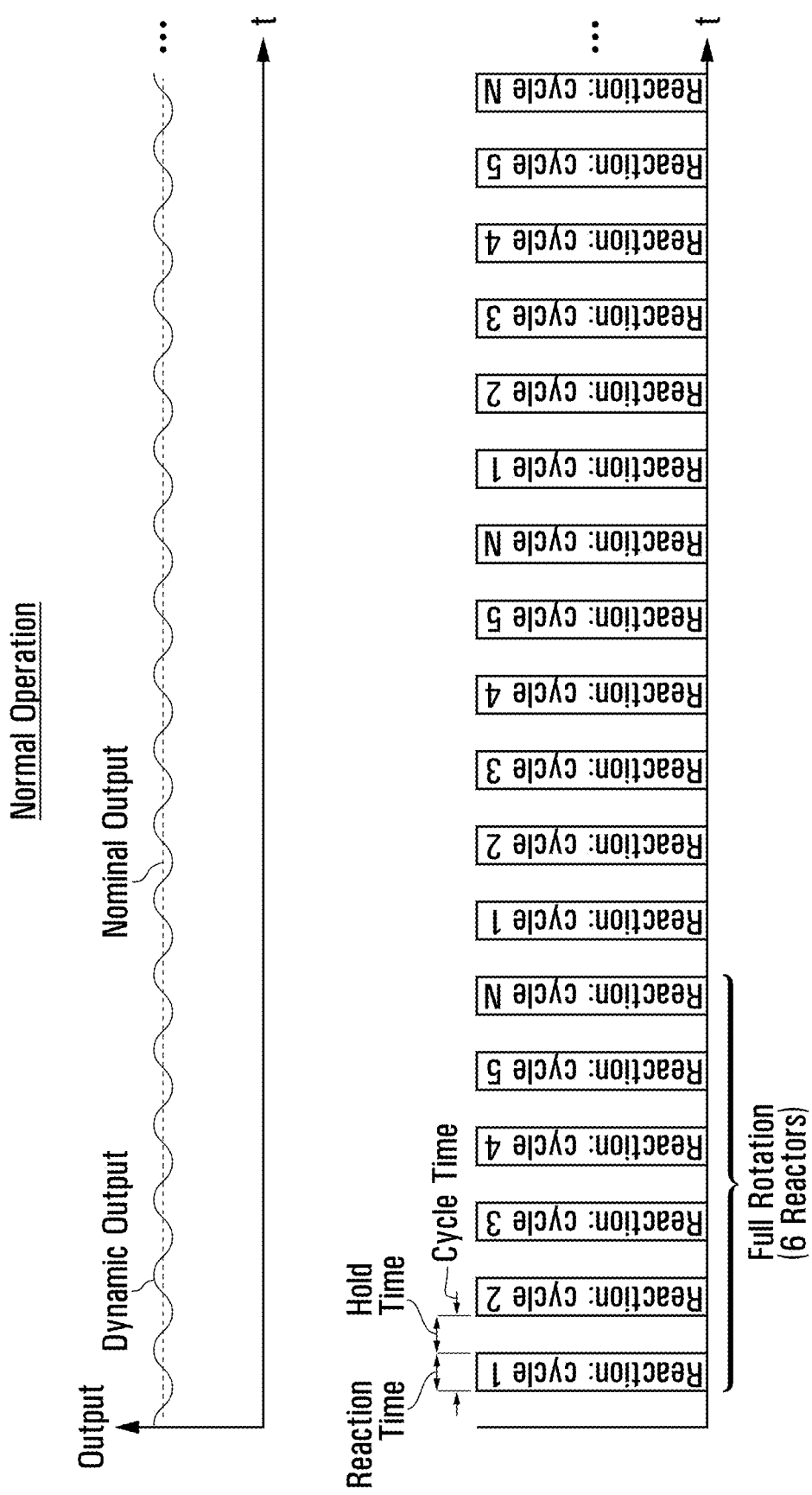

Referring to FIG. 2, the controller 60 is communicative with the valves 12, 14, 36, 37, 38 for each reactor 1 . . . n and is operable to control the valve timing so that after each ignition cycle, each fuel and oxidant valve 36, 37 and each mixing chamber inlet valve 12 is sequentially opened (shown as open boxes) to supply fuel and oxidant into each combustion chamber and feedstock gases into each mixing chamber, while the other fuel and oxidant valves and mixing chamber valves remain closed (shown as "X" boxes). Similarly, the controller 60 sequentially opens each mixing chamber outlet valve 14 and combustion product exhaust valve 38 after each reactor 1 . . . n has completed its pyrolysis cycle. The output of an exemplary pyrolysis system 100 having six reactors is shown in FIG. 5A, wherein the sequential opening of each mixing chamber outlet valve after each reaction cycle creates a sinusoidal dynamic output, resulting in a quasi steady-state output.

The pyrolysis system includes reaction product sensors 70 which are located in the reaction product conduit 66 and are configured to monitor the hydrogen and carbon output from each reactor 1 . . . n. Alternatively, the reaction product sensors 70 can be located downstream of a carbon separator and hydrogen separator (not shown). The reaction product sensors 70 can be selected from commercially available sensors suitable to detect certain properties of carbon and hydrogen gases, including mass or volumetric flow meters such as Coriolis, turbine and ultrasonic, gas composition sensors such as mass spectrometers, temperature sensors such as thermocouples and thermistors, and pressure sensors such as piezoresistive and variable capacitive sensors. In other embodiments (not shown), the sensors 70 can be located elsewhere downstream of the mixing chamber 10, e.g. at the outlet valve 14 of each mixing chamber 10, or downstream of respective carbon and hydrogen separators (not shown) of the pyrolysis system.

The controller 60 can be any type of programmable controller known in the art, such as a direct digital controller (DDC), a proportional integral derivative controller (PID), a programmable logic controller (PLC), an application specific integrated circuit (ASIC), or a general purpose computer. The controller 60 is communicative with the sensors 70 and receives hydrogen and carbon production measurements taken by the sensors 70.

Figure 3:
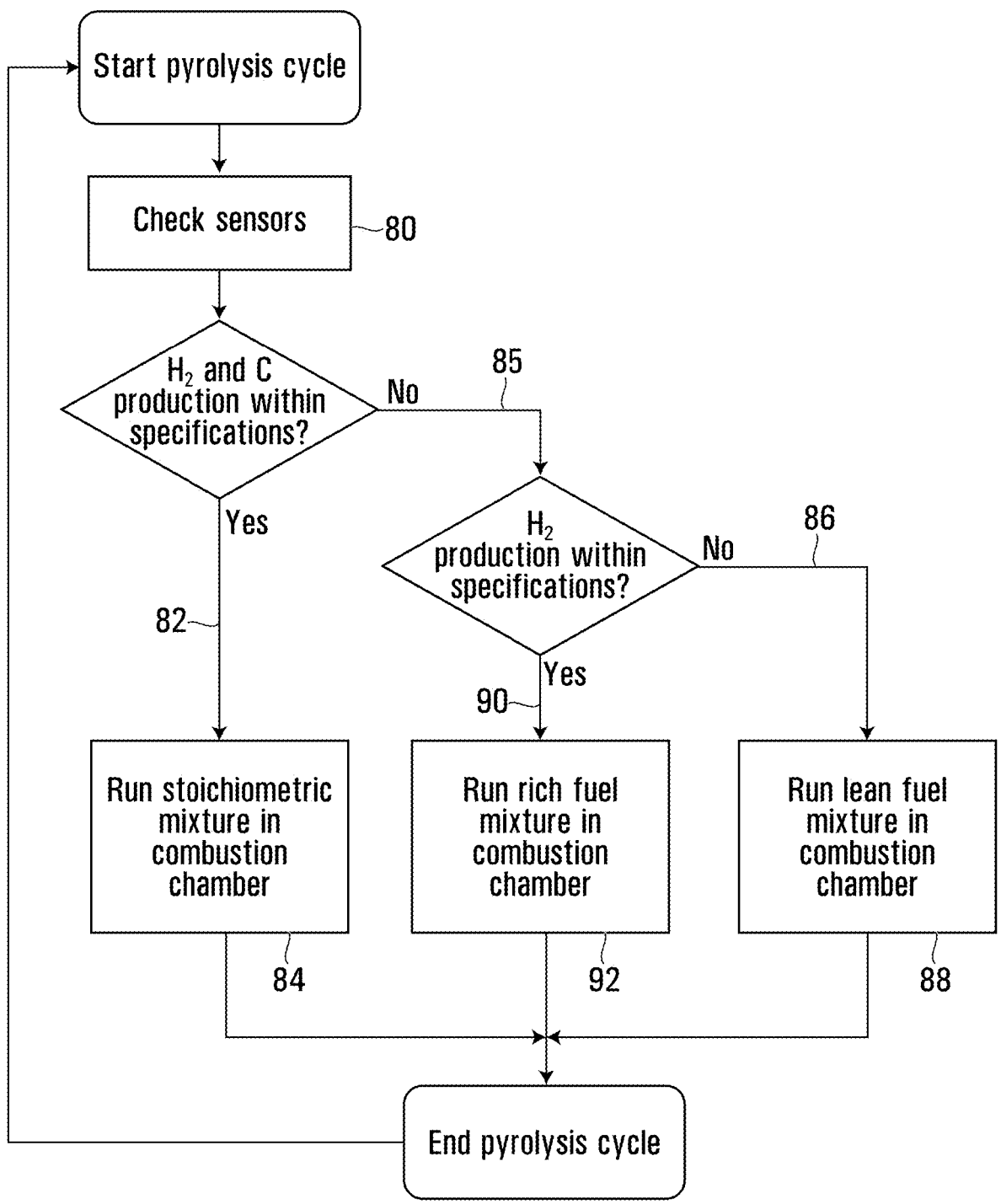
FIG. 3 is a flow chart showing the operating logic of a pyrolysis operating program executed by the controller, according to an embodiment of the disclosure.

Referring to FIG. 3, the controller 60 has a memory encoded with a pyrolysis operating program executable by the controller 60 to perform a normal pyrolysis operation when the measured hydrogen and carbon production is within a target hydrogen and carbon production specification, and to perform one or more of a lean burn operation and a rich burn operation when one or more of the hydrogen and carbon production is outside the target hydrogen and/or carbon production specification.

In a normal pyrolysis operation, the controller 60 adjusts the hydrogen and oxidant valves 36, 37 so that a stoichiometric air/fuel mixture is supplied to the combustion chamber 10. When the fuel is methane, the exact amount of oxygen required to completely consume the methane is 2 mol $O_2$ for every mol $CH_4$ and which is referred to as a stoichiometric mixture. An equivalence ratio $\Phi$ can be used to compare any fuel/oxidant ratio to the stoichiometric ratio and is given by:

$$\Phi = \frac{\text{fuel oxidant ratio}}{(\text{fuel oxidant ratio})st}$$

Wherein
$\Phi$=fuel/oxidant equivalence ratio
st=stoichiometry

For rich combustion, $\Phi>1.1$. For lean combustion, $\Phi<0.9$. For stoichiometric combustion, $\Phi=0.9-1.1$ (hereinafter referred to as the "fuel/oxidant equivalence ratio range").

Once the pyrolysis system 100 starts a new pyrolysis cycle, the controller 60 checks the sensors 70 (step 80) and determines whether the pyrolysis system 100 is producing hydrogen and carbon within the target specifications. If yes (82), the controller 60 executes a normal operation 84 and sets the fuel and oxidant valves 36, 37 to maintain a fuel/oxidant mixture within the fuel/oxidant equivalence ratio range ($\Phi0.9-1.1$).

Should the sensor measurements detect a decrease in hydrogen and carbon mass flow rate and/or an increase in temperature outside of target specifications (85), the inside of the mixing chamber 10 may have become coated with carbon. It is theorized that a build up of carbon would effectively decrease the total gas volume of the mixing chamber 10, and consequently the pyrolysis system 100 cannot load as much feedstock into the mixing chamber 10, thus causing a decrease in the rate of hydrogen and carbon production. Also, the carbon buildup can cause the temperature inside the mixing chamber 10 to increase, since the combustion chamber 30 is a fixed volume, the same amount of energy from the combustion is added to a smaller amount of feedstock in the mixing chamber 10.

When the controller 60 determines that both the measured hydrogen and carbon production is outside of the target specification (86), the controller 60 executes a lean burn operation 88 and sets the fuel and oxidant valves 36, 37 to supply a lean fuel/oxidant mixture ($\Phi<0.9$) to the combustion chamber 30. Because there is insufficient fuel to burn all the supplied oxidant, non-combusted oxidant (oxygen) will be introduced into the mixing chamber 10, which will react with the carbon on the walls and convert it to $CO_2$ and/or $CO$ which would be removed or processed downstream. The lean burn operation can be run continuously (every reaction cycle) or periodically (every nth cycle) until the carbon and hydrogen production rates came back within the target specifications.

When the controller 60 determines that only the measured carbon production is outside the target carbon specification (90), the mixing chamber valve timing (time between opening mixing chamber inlet valve 12 and opening mixing chamber outlet valve 14) may not be long enough to complete the formation of carbon in the mixing chamber 10. In other words, the reaction cycle timing is lower than the carbon residence time, which could result in lower carbon production or an undesirable change in carbon morphology. Since lengthening the mixing cycle valve timing would decrease the hydrogen production rate, the controller 60 instead adjusts the fuel and oxidant valves 36, 37 to supply a rich fuel/oxidant mixture ($\Phi>1.1$) to the combustion chamber (92). This will cause an incomplete combustion of the fuel and produce soot in the combustion chamber. The soot is a mass of carbon particles, and is injected into the mixing chamber 10 to seed carbon formation and reduce carbon residence time.

According to some other embodiments, a pyrolysis system 100 has a controller 60 encoded with a pyrolysis operating program that includes a de-fouling operation that is carried out in one or more reactors. A de-fouling operation is similar in purpose to a lean burn operation to remove carbon deposits in the mixing chamber, except that no fuel is supplied to the combustion chamber 30 and thus there is no ignition cycle. In other words, the equivalence ratio is zero in a de-fouling operation since the fuel/oxidant ratio is zero. Oxidant is fed to the combustion chamber 30 and then to the mixing chamber 10, and oxygen is allowed to react with the carbon deposits to form $CO$ and $CO_2$ which are then discharged from the mixing chamber 10.

Figure 4A:
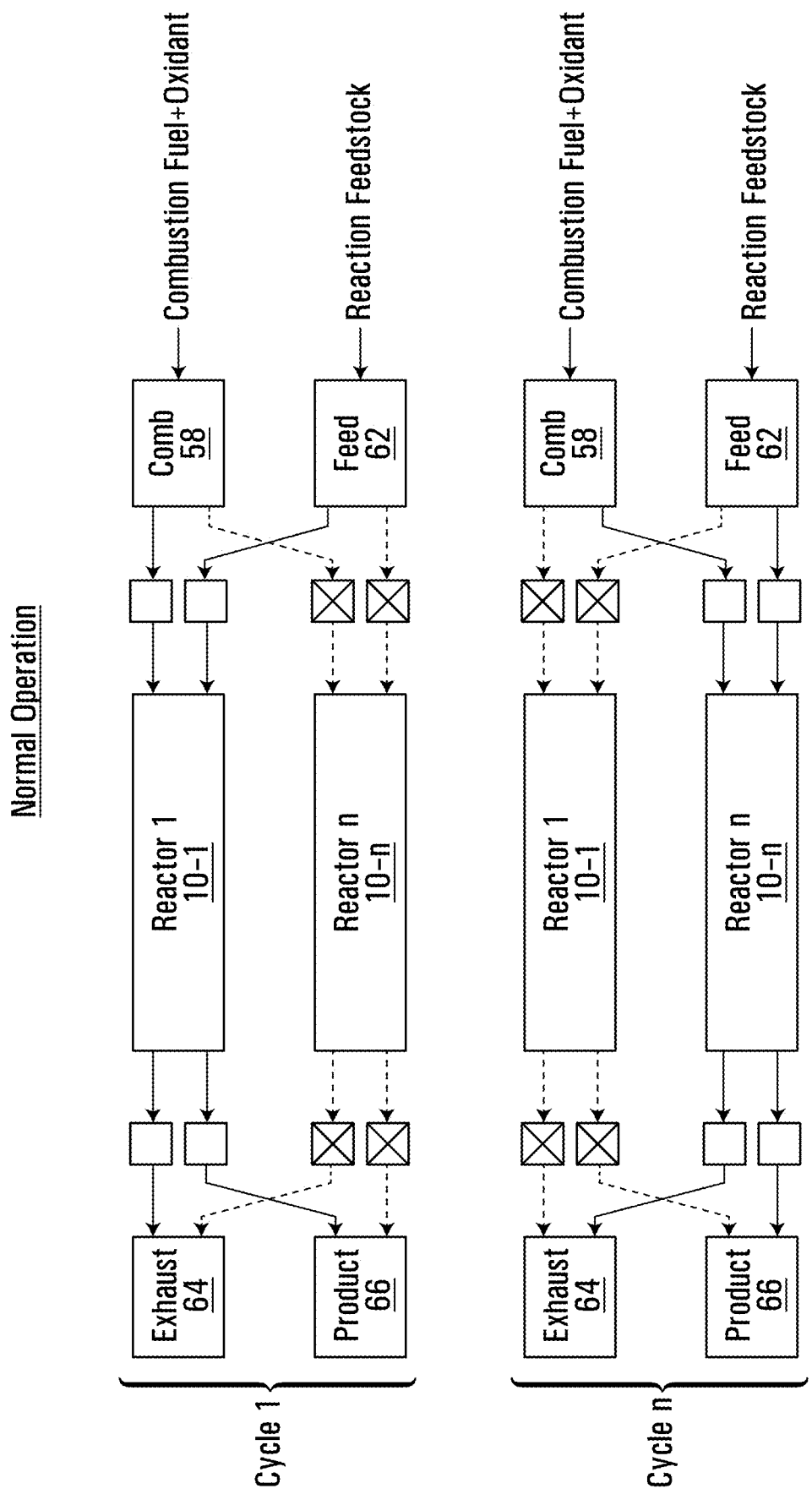
Figure 4B:
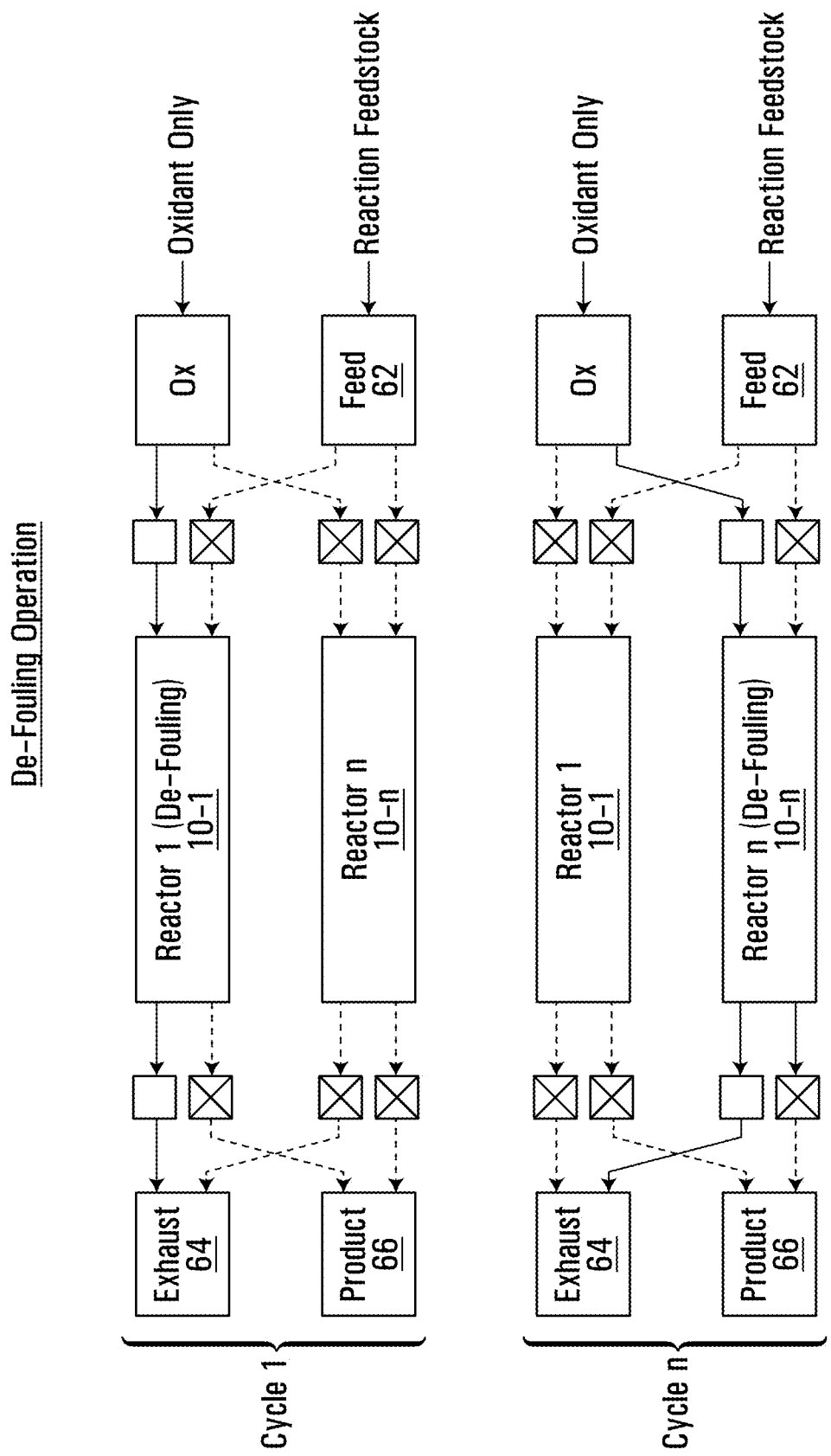
Figure 5B:
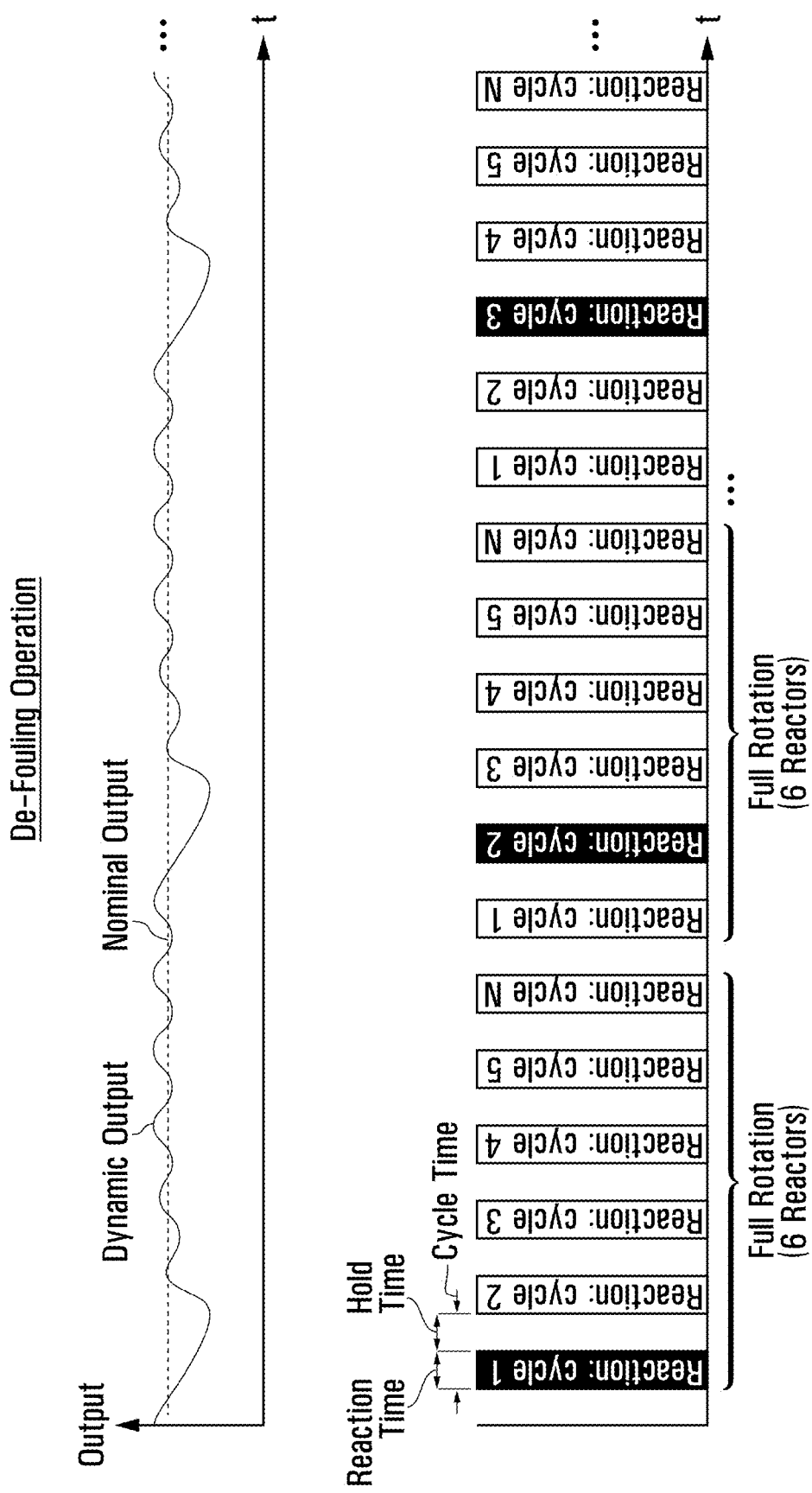

Referring to FIGS. 4B and 5B, an embodiment comprises a multiple reactor pyrolysis system 100 with a controller 60 programmed to sequentially execute a de-fouling cycle in each single reactor in the normal course of reactor reaction cycling (cycle 1 . . . n). Since the sequential firing of multiple reactors results in a quasi-steady-state output, taking one reactor offline for a single cycle is expected to minimally affect the product output stream. The de-fouling cycle is then repeated for each reactor in a separate sequence while the other reactors are still producing, thereby enabling the pyrolysis system 100 to perform a de-fouling operation on each one of its reactors without interrupting carbon and hydrogen production.

The controller 60 executes the de-fouling operation for a reactor in a group of reactors 1 . . . n, as follows:
1. Periodically close the fuel valve 36 to halt the supply of fuel to the combustion chamber 30 while opening oxidant valve 37 for the subject reactor 1, thereby supplying oxidant (e.g. pure $O_2$) into the combustion chamber 30 and then into the mixing chamber 10 of reactor 1; close inlet valve 12 of the mixing chamber 10 of reactor 1 to halt supply of feedstock gas into reactor 1.
2. For the period of a normal reaction cycle, allow the $O_2$ to react with deposited carbon in the mixing chamber 10 of reactor 1 to form an emission gas of predominantly $CO_2$.
3. Open mixing chamber outlet valve 14 of reactor 1 to exhaust the emission gas from the reactor 1.
4. Repeat the sequence for the other reactors 2 . . . n in the pyrolysis system 100.
5. If needed repeat the de-fouling operation again for all reactors until it is determined that sufficient cycles have been completed to remove the carbon deposits.

FIG. 5B illustrates how the de-fouling cycle can be interjected into the normal operating sequence with minimal effect on the process output. Under normal circumstances the sequencing of multiple reactors produces a nominal steady-state output, much like the firings of pistons in an internal combustion engine produce a steady output torque. In the de-fouling operation, a single reactor cycle may perform a de-fouling operation while the remainder of reactor operate as normal. The de-fouling operation can then be repeated or moved to the next reactor and this process can be repeated as necessary to clear the reactors of deposits. The output may have small temporal variations which are illustrated in FIG. 5B in an exaggerated manner for to depict the effect of the de-fouling operation. The result is the ability to perform de-fouling maintenance routines while the process remains in an operational state.

While the above embodiments have generally been described in the context of decomposing methane, the concepts described herein may be applied to other feedstock hydrocarbon gases, such as natural gas, hydrogen, ethane, propane, butane and mixtures thereof. Also, gases in the mixing chamber that have not been separated into carbon and hydrogen can be recycled for use as feedstock.

The terms "a" or "an" when used in conjunction with the terms "comprising" or "including" in the claims and/or the specification can mean "one" but it is also consistent with the meaning of "one or more", "at least one", and "one or more than one" unless the content clearly dictates otherwise. Similarly, the word "another" may mean at least a second or more, unless the content clearly dictates otherwise.

The terms "coupled", "coupled", or "connected" as used herein, may have a number of different meanings depending on the context in which the terms are used. For example, the terms coupled, or connected may have a mechanical or electrical meaning. For example, as used herein, the terms coupled, or connected may indicate that two elements or devices are connected to each other directly or via one or more intermediate elements or devices via electrical, or mechanical elements, depending on the particular context. The term "and/or" as used herein when used in association with a list of items refers to any one or more of the items comprising the list.

As used herein, reference to "about" or "approximately" a number or "substantially" is equal to a number means within +/−10% of the number.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. A method for operating a pyrolysis reactor, comprising:
supplying a first amount of fuel and oxidant within a fuel/oxidant equivalence ratio range into a combustion chamber and combusting the first amount of fuel and oxidant to produce a combustion product; supplying a feedstock and the combustion product into a mixing chamber, wherein the combustion product mixes with the feedstock and the feedstock is decomposed into reaction products including hydrogen and carbon in a pyrolysis operation;
monitoring production of the carbon and hydrogen during the pyrolysis operation;
supplying a second amount of oxidant into the mixing chamber when the monitored carbon and hydrogen production is outside a target carbon and hydrogen specification, and reacting the supplied oxidant with carbon attached to walls of the mixing chamber; and
supplying a third amount of fuel and oxidant into the combustion chamber at a rich fuel/oxidant ratio above the fuel/oxidant equivalence ratio range when only the monitored carbon production is outside a target carbon specification and combusting the third amount of fuel and oxidant to produce the combustion product and soot; supplying the feedstock, the combustion product and the soot into the mixing chamber, wherein the combustion product and soot mix with the feedstock, and the feedstock is decomposed into the reaction products in a pyrolysis operation and the soot seeds carbon formation.

2. The method as claimed in claim 1 wherein the fuel/oxidant equivalence ratio range is between 0.9 and 1.1.

3. The method as claimed in claim 1 wherein at least one of the fuel and feedstock are selected from a group consisting of methane, natural gas, hydrogen, ethane, propane, butane and mixtures thereof.

4. The method as claimed in claim 1 wherein when the monitored carbon and hydrogen production is outside the target carbon and hydrogen specification, the method further comprises executing a de-fouling operation comprising: halting supplying the fuel into the combustion chamber and halting supplying the feedstock into the mixing chamber; and supplying the second amount of oxidant into the combustion chamber and then to the mixing chamber for reacting with the carbon attached to walls of the mixing chamber.

5. The method as claimed in claim 1 wherein when the monitored carbon and hydrogen production is outside the target carbon and hydrogen specification, the method further comprises executing a lean burn operation comprising: supplying a fourth amount of fuel and oxidant into the combustion chamber at a lean fuel/oxidant ratio below the fuel/oxidant equivalence ratio range, combusting the fourth amount of fuel and some of the fourth amount of oxidant to produce the combustion product, and supplying non-combusted oxidant into the mixing chamber for reacting with the carbon attached to walls of the mixing chamber.

6. The method as claimed in claim 4, wherein the pyrolysis reactor comprises multiple reactors each having a mixing chamber, and the method further comprises executing the de-fouling operation in the mixing chamber of one of the reactors while executing the pyrolysis operation in the one or more other reactors.

7. The method as claimed in claim 6 further comprising halting supplying the fuel and supplying only the second amount of oxidant to each reactor of the multiple reactors in sequence, thereby sequentially executing the de-fouling operation in the mixing chamber of each of the reactors.

8. The method as claimed in claim 1 wherein monitoring production of carbon and hydrogen comprises monitoring a flow rate of the carbon and hydrogen.

9. A pyrolysis system, comprising:
(a) at least one combustion chamber having a fuel inlet, an oxidant inlet, a combustion product outlet, and an exhaust outlet;
(b) at least one mixing chamber having a combustion product inlet communicative with the combustion chamber combustion product outlet, a feedstock inlet, and a reaction product outlet;
(c) hydrogen and carbon sensors in communication with the reaction product outlet;
(d) a controller having a memory encoded thereon with program code executable by the controller to:
control supply of a first amount of fuel and oxidant into the at least one combustion chamber within a fuel/oxidant equivalence ratio range, wherein the first amount of fuel and oxidant combust to produce a combustion product; control supply of a feedstock and the combustion product into the at least one mixing chamber, wherein the combustion product mixes with the feedstock, and the feedstock is decomposed into reaction products including hydrogen and carbon in a pyrolysis operation;
monitor the hydrogen and carbon sensors to determine production of the hydrogen and carbon during the pyrolysis operation;
control supply of a second amount of oxidant into the at least one mixing chamber when the monitored carbon and hydrogen production is outside a target carbon and hydrogen specification, wherein the supplied oxidant is reacted with carbon attached to walls of the at least one mixing chamber; and
control supply of a third amount of fuel and oxidant into the at least one combustion chamber at a rich fuel/oxidant ratio that is higher than the fuel/oxidant equivalence ratio range when only the monitored carbon production is outside a target carbon specification, wherein the third amount of fuel and oxidant combust to produce the combustion product and soot; control supply of the feedstock, the combustion product and the soot into the at least one mixing chamber, wherein the combustion product and soot mix with the feedstock, and the feedstock is decomposed into the reaction products in a pyrolysis operation and the soot seeds carbon formation.

10. The system as claimed in claim 9 wherein the fuel/oxidant equivalence ratio range is between 0.9-1.1.

11. The system as claimed in claim 9 wherein the carbon and hydrogen sensors are mass flow sensors.

12. The system as claimed in claim 9 wherein at least one of the feedstock and fuel are selected from a group consisting of methane, natural gas, hydrogen, ethane, propane, butane and mixtures thereof.

13. The system as claimed in claim 9, further comprising multiple reactors, wherein each reactor comprises at least one of the combustion chambers.

14. The system as claimed in claim 13 wherein the at least one mixing chamber is a common mixing chamber communicative with each combustion chamber of the multiple reactors.

15. The system as claimed in claim 13 wherein each reactor comprises at least one of the mixing chambers, and further comprising a common reaction product conduit communicative with each mixing chamber of the multiple reactors, and wherein the hydrogen and carbon sensors are located in the common reaction product conduit.

16. The system as claimed in claim 15 further comprising a common reaction product conduit communicative with each mixing chamber of the multiple reactors and with a carbon separator and a hydrogen separator, and wherein the hydrogen sensor is located downstream of the hydrogen separator and the carbon sensor is located downstream of the carbon separator.

17. The system as claimed in claim 15, wherein the controller memory is further encoded with program code executable by the controller to sequentially perform a de-fouling operation for each reactor of the multiple reactors, wherein the de-fouling operation comprises for each reactor in sequence: halting supplying the fuel and feedstock to the combustion chamber and mixing chamber respectively, and supplying only the second amount of oxidant to the combustion chamber and then to the mixing chamber, wherein the supplied oxidant is reacted with the carbon attached to walls of each of the mixing chambers.

18. The system as claimed in claim 17, wherein the controller controls the supply of the fuel, oxidant and feedstock to all of the reactors to perform a normal pyrolysis operation, except for the reactor performing a de-fouling operation, such that the system continues to produce carbon and hydrogen while sequentially performing the de-fouling operation in each reactor.

19. A method of operating a pyrolysis reactor, comprising:
supplying a first amount of fuel and oxidant within a fuel/oxidant equivalence ratio of 0.9 to 1.1 into a combustion chamber and combusting the first amount of fuel and oxidant to produce a combustion product;
supplying a feedstock and the combustion product into a mixing chamber, wherein the feedstock mixes with the combustion product and is decomposed into reaction products including hydrogen and carbon in a pyrolysis operation;
monitoring production of the carbon and hydrogen during the pyrolysis operation; and
supplying a second amount of oxidant into the mixing chamber when the monitored carbon and hydrogen production is outside a target carbon and hydrogen specification, and reacting the supplied second amount of oxidant with the carbon attached to walls of the mixing chamber.

20. A method of operating a pyrolysis reactor, comprising:
supplying a first amount of fuel and oxidant within a fuel/oxidant equivalence ratio of 0.9 to 1.1 into a combustion chamber and combusting the first amount of fuel and oxidant to produce a combustion product;
supplying a feedstock and the combustion product into a mixing chamber, wherein the feedstock mixes with the combustion product and is decomposed into reaction products including hydrogen and carbon in a pyrolysis operation;

monitoring production of the carbon and hydrogen during the pyrolysis operation; and supplying a second amount of fuel and oxidant into the combustion chamber at a rich fuel/oxidant ratio having a fuel/oxidant equivalence ratio greater than 1.1 when only the monitored carbon production is outside a target carbon specification and combusting the second amount of fuel and oxidant to produce the combustion product and soot; supplying the feedstock, the combustion product and the soot into the mixing chamber, wherein the combustion product and soot mix with the feedstock and the feedstock is decomposed into the reaction products in a pyrolysis operation and the soot seeds carbon formation.

\* \* \* \* \*